No. 672,910. Patented Apr. 30, 1901.
W. LINERODE.
PIPE CLAMP.
(Application filed Nov. 21, 1900.)
(No Model.)
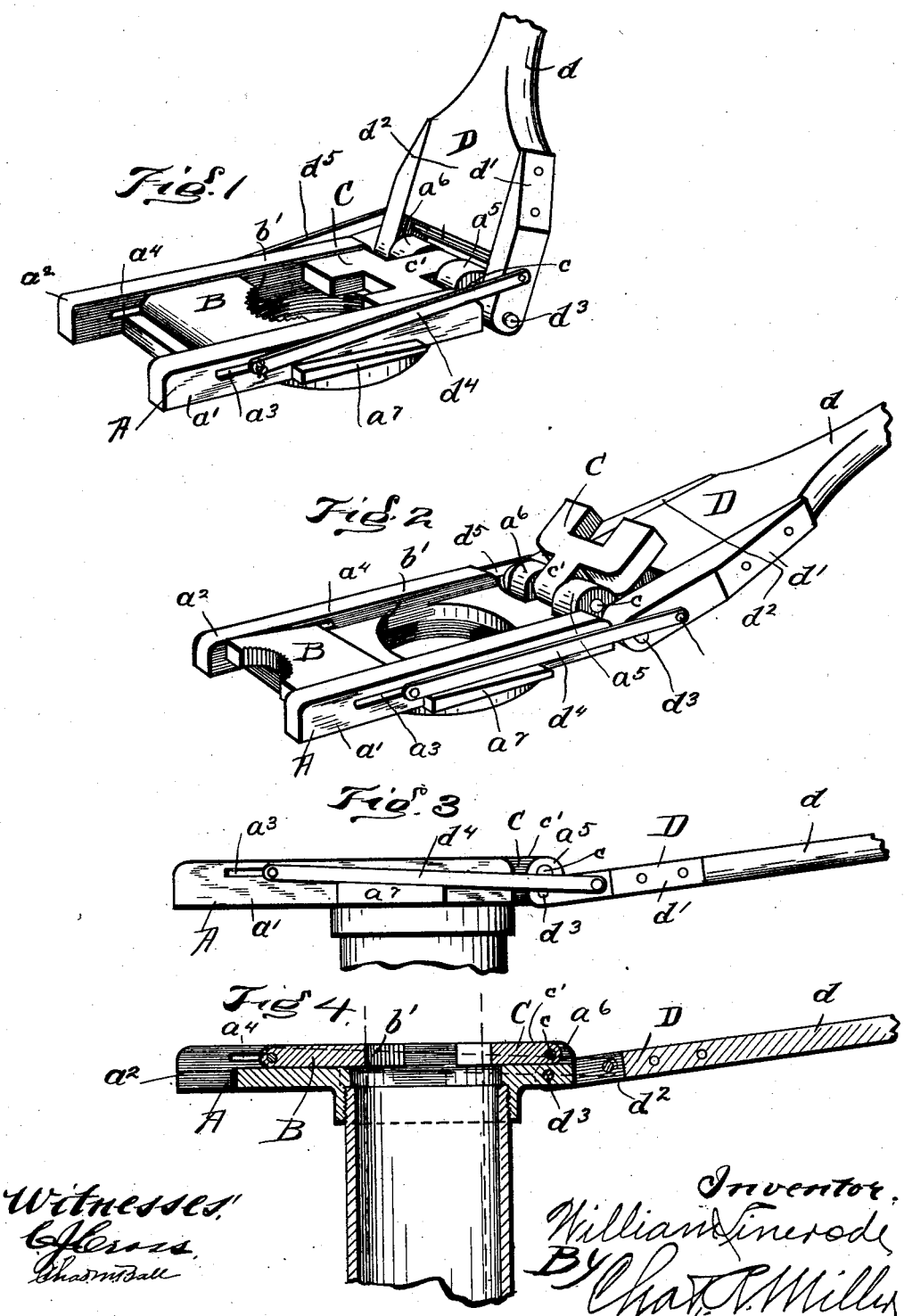

UNITED STATES PATENT OFFICE.

WILLIAM LINERODE, OF BOLIVAR, OHIO.

PIPE-CLAMP.

SPECIFICATION forming part of Letters Patent No. 672,910, dated April 30, 1901.

Application filed November 21, 1900. Serial No. 37,238. (No model.)

*To all whom it may concern:*

Be it known that I, WILLIAM LINERODE, a citizen of the United States, residing at Bolivar, in the county of Tuscarawas and State of Ohio, have invented new and useful Improvements in Pipe-Clamps, of which the following is a specification.

My invention relates to improvements in pipe-clamps for driven wells, and has for its object the providing of mechanism adapted to be mounted upon the tubing of a well and provided with adjustable dogs for engagement with the pipe or rod of the drill and a locking mechanism by which the jaws of the dogs are securely held against the pipe, so as to permit of the removal or attachment of sections of the pipe, as will be hereinafter more fully described and claimed.

In the accompanying drawings similar letters of reference refer to similar parts.

Figure 1 is a perspective view of my invention. Fig. 2 is a like view showing the hinged dogs turned back. Fig. 3 is a side view, and Fig. 4 is a sectional view.

The frame A has formed upon its bottom an internally-screw-threaded circular flange $a$, which may be of any desired diameter, adapted to engage with a corresponding externally-screw-threaded portion of the casing of the well. On both sides of the frame A there are formed the side bars $a'$ and $a^2$, provided with the horizontal slots $a^3$ and $a^4$ forward of the center of the frame. Hinged to the frame by means of a rod $b$, passing through the slots $a^3$ and $a^4$, there is provided the dog B, having the semicircular serrated jaw $b'$, for the purpose of engagement with the pipe or rod. To the other end of the frame there is hinged to projecting lugs $a^5$ and $a^6$ a U-shaped dog C, which is held in engagement with the frame A by means of the bolt $c$, passing through the lugs $a^5$ and $a^6$, and the projecting lug $c'$, formed integral with the dog C. Hinged to the frame below the dog C there is provided the lever D, which may be made in any desired form and of any desired material; but I have shown it consisting of a wooden handle $d$, having securely bolted thereto metal bars $d'$ and $d^2$, which project beyond the end of the handle $d$, having a hinged connection with the frame A by means of the bolt $d^3$, which passes through the bars $d'$ and $d^2$ and the frame A. The lever D is connected to the dog B by means of the connecting-rods $d^4$ and $d^5$, which have a pivotal connection with both the lever D and the dog B. Upon the side of the frame A there is provided a stop $a^7$.

In operation the apparatus is mounted upon the upper section of the well-casing by means of the screw-threaded engagement of the frame with the casing. The dogs are then turned back, the driving-tube inserted, the dogs turned forward, and the pipe or driving-tube is then securely held in engagement with the dogs and can be tightly gripped or released by the forward or backward movement of the lever D, which causes the dog B to travel forward and backward to and from the driving-tube. In case it is desired to securely grip the driving-tube and hold it against movement for the purpose of attaching another section the lever D is pressed downward, thus forcing the dog B up against and securely engaging the driving-tube, and is thus held securely against movement, the lever end of the connecting-rods $a^4$ and $a^5$ having passed or traveled below a line drawn through the pivotal points of the dogs B and C with the frame.

Having thus fully described my invention, what I claim, and desire to secure by Letters Patent, is—

The combination in a clamp for holding drill-tubes, of a frame having a circular aperture in the bottom thereof, and provided with an internally-screw-threaded projecting circular flange, adapted to engage the tube of a well, horizontal slots in the sides of the frame, a dog provided with a semicircular, serrated jaw, adapted to be mounted in said horizontal slots, a substantially U-shaped dog having a hinged connection with the opposite end of the frame, an operating-lever having a hinged engagement with the frame at a point below the line of engagement of the dogs, coupling-rods connecting said operating-lever with the forward dog, substantially as described and for the purpose set forth.

In testimony whereof I have hereunto set my hand in the presence of two subscribing witnesses.

WILLIAM LINERODE.

Witnesses:
CHAS. R. MILLER,
CHAS. M. BALL.